Oct. 19, 1965   O. FISCHER   3,212,419
PHOTOGRAPHIC CAMERA WITH BUILT-IN ELECTRIC EXPOSURE METER
Filed Feb. 8, 1963   3 Sheets-Sheet 2

United States Patent Office 3,212,419
Patented Oct. 19, 1965

3,212,419
PHOTOGRAPHIC CAMERA WITH BUILT-IN ELECTRIC EXPOSURE METER
Oskar Fischer, Volkmarode, Germany, assignor to Voigtlander A.G., Braunschweig, Germany, a corporation of Germany
Filed Feb. 8, 1963, Ser. No. 257,229
Claims priority, application Germany, July 11, 1962, V 14,224
2 Claims. (Cl. 95—10)

This invention relates to photographic cameras with built-in electric exposure meters including photoelectric cells mounted on the front face of the objective. More particularly, this invention is directed to an improved photographic camera of this type providing plural mounting means for optical accessories such as filters and additional lenses.

In photographic cameras of the mentioned type, the photoelectric cells of the exposure meter are either annular in shape, in the usual case, and mounted coaxially of the objective axis, or else the photoelectric cells are positioned in and along an annular path concentric with the objective axis. An advantage of these arrangements is that filters and the like which are intended to be positioned ahead of the lenses of the objective, and which are secured to the outer periphery of the objective mount, also influence the light rays impinging upon the photoelectric cell in an appropriate manner. Thus, the measuring instrument which is connected to the photoelectric cell or cells has a deflection which is modified by the filter factor. As a result, the user of such a camera does not have to take into account any additional adjustments to account for the factor of whatever filter he happens to be using at a particular time, once the user has set the camera for exposure factors in accordance with the reading of the measuring instrument.

In addition to accessories which require a change in the exposure factor, other accessories for the objective are provided in the camera, usually being mounted in the case thereof in the same place and in the same manner as are those accessories which do require a change in the exposure factors. Such other accessories may include auxiliary lenses or ultraviolet filters. These auxiliary lenses, usually mounted at the front or outer end of the objective, and the UV filters, also mounted at the outer end of the objective, at present are in the path of light rays impinging upon the photoelectric cells as well as upon those light rays entering upon the optical axis of the objective.

However, as distinguished from those accessory parts or accessories, such as color filters, which require a change in the exposure factor adjustment, such front lenses and ultraviolet filters do not cause appreciable modification of the exposure reading to a value which is significant from the standpoint of setting the exposure values. Consequently, there is no particular advantage to positioning such latter accessories, such as auxiliary lenses and UV filters, on the objective in such a manner that they influence or are in the path of light rays incident upon the photoelectric cell or cells. Consequently, auxiliary lenses and ultraviolet filters have a diameter which is much larger than is necessary for mere positioning in the path of those light rays which enter the objective along the optical axis thereof. As a result, the cost of such accessories, as well as those accessories which influence the light rays incident upon the photoelectric cells, can be reduced if a camera is so designed that it has an objective on which there can be mounted accessories having different diameters, with the respective diameters being coordinated with the special purposes of the accessories to attain the advantages mentioned above.

In accordance with the present invention, a camera is provided in which the objective mount is formed or provided with two different mounting positions, each corresponding with the diameter of an accessory requisite to fulfill its particular function, with the mounting place of one diameter receiving those accessories which are intended to influence the exposure meter and the mounting place of a different diameter receiving those accessories which have a negligible influence upon the exposure meter reading. Thus, one mounting or anchoring position is coordinated with the diameter of those accessories which are intended to cover or to be positioned in the path of light rays effective both upon the objective lenses and upon the photoelectric cells. The other mounting position or anchoring point is coordinated with the diameter of those accessory parts which are intended to cover only the objective lens aperture.

It is advantageous to space the two anchoring or mounting positions axially from each other along the axis of the objective, so that both types of accessories may be secured to the objective mount at the same time, with one accessory covering only the objective lens aperture and the other accessory covering both the objective lens aperture and the photocell means. The mounting positions or anchoring points of the objectives can be designed in a known manner, so that the accessories may be secured thereto either by plugging in, threaded connections, or bayonet mounts.

For an understanding of the principles of the invention, reference is made to the following description of typical embodiments thereof as illustrated in the accompanying drawings. In the drawings.

Figure 1:
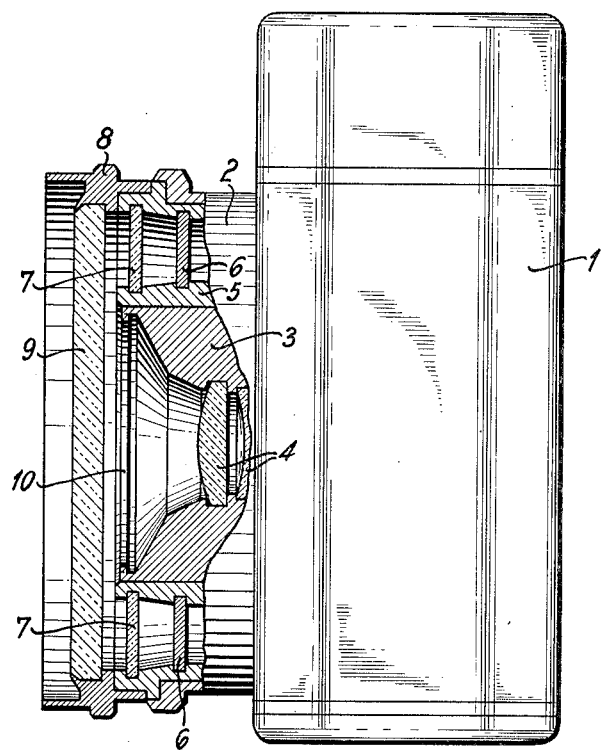
FIG. 1 is a side elevational view, partly broken away, illustrating a camera embodying the invention and having one type of accessory mounted thereon.

In each of the figures of the drawings, the camera is illustrated as having a casing or housing 1 on which there is mounted an objective lens unit 2, the unit 2 being either permanently or interchangeably mounted on the housing or casing 1. As partly illustrated, the objective lenses 4 of the photographic lens assembly are positioned in a mount 3, which is surrounded by a mounting frame or unit 5 supporting an annular photosensitive cell 6 of an electric exposure meter not shown in detail. An annular cover plate 7, of light permeable material, is also positioned in the mounting frame 5 and protects the photosensitive cell 6.

As illustrated particularly in FIG. 1, a plug-in type of mounting 8 used, for example, for a yellow filter 9, is arranged to be telescoped over the outer periphery of the objective unit 2. Thus, the filter 9 covers both the objective lens aperture and the plate 7, so that light rays incident upon the photocell 6 are influenced in accordance with the filter factor or transmission coefficient of the filter 9. This arrangement for mounting a filter on the objective and in the path of light rays impinging upon the photosensitive cell 6 is broadly old in the art.

The novel feature of the present invention resides in the provision of a second mounting or anchoring position on the objective unit 2 to receive an accessory designed to cover only the objective lens aperture but without covering the photosensitive cell or being positioned in the path of light rays incident upon the cell 6.

Figure 2:
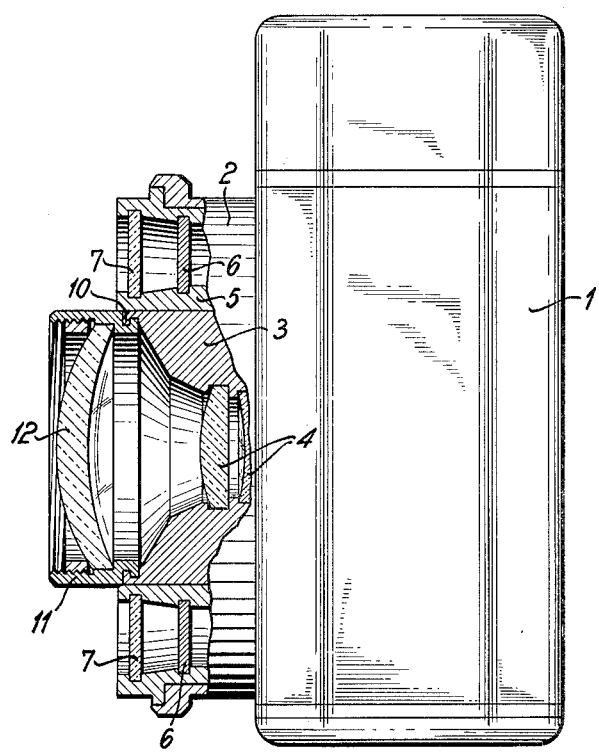
FIG. 2 is a view, similar to FIG. 1, illustrating the camera of FIG. 1 with another type of accessory mounted thereon.

In FIG. 1, this additional mounting or mount receiving configuration of the objective is indicated at 10 and is designed as part of a bayonet type joint. FIG. 2 illustrates an accessory mounted in the additional mounting position 10. In FIG. 2, the plug-in type of mounting 8 illustrated in FIG. 1 has been removed, and a mounting 11 for an auxiliary front lens 12 is anchored in the bayonet type mount 10. While an auxiliary front lens 12 is illustrated as an accessory positioned in the mounting 11, it will be understood that this is exemplary only, as the accessory could be, for example, a UV filter or any other type of accessory which does not require any modification of the exposure meter value to be taken into account, and thus does not need to be positioned in advance of the photosensitive cell along the light ray path. Such accessories, inasmuch as they do not have to cover the cover plate 7, can thus be designed with a much smaller diameter than other accessories, such as the filter 9 of FIG. 1, whose filter factor must be taken into account in the setting of the exposure factor.

Figure 3:
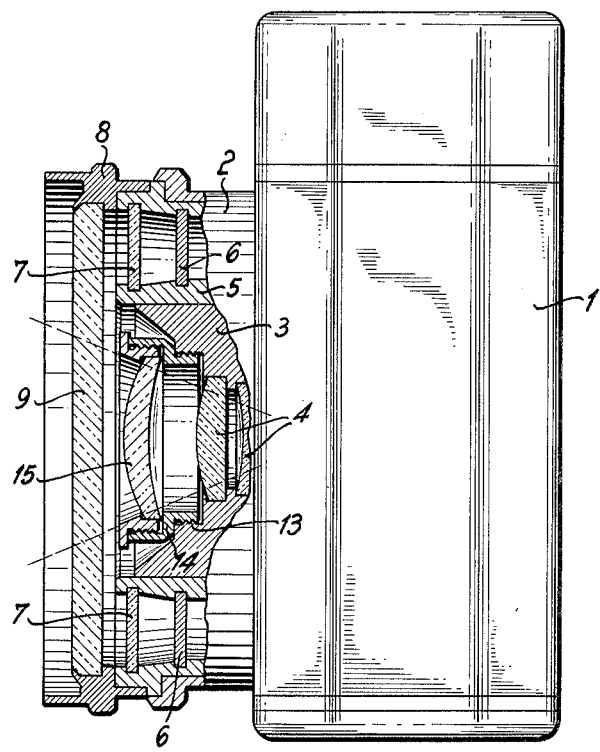
FIG. 3 is a side elevational view, partly in section, of a preferred form of camera embodying the invention and on which accessories of both types may be mounted at the same time.

FIG. 3 illustrates an arrangement of the objective unit 2 whereby both types of accessories may be simultaneously mounted on the objective. Thus, there can be mounted on the objective 2 both a color filter, such as 9, which influences the exposure condition setting, and an auxiliary lens or ultraviolet filter 15, which does not influence the exposure value setting.

In the arrangement shown in FIG. 3, the filter, such as 9, is again positioned in the mount 8 which has a plug-in fit on the exterior periphery of the objective unit 2. However, the mounting for the accessory 15, which may be an auxiliary front lens, an ultraviolet filter, or other accessory, not influencing significantly the exposure value factor, is displaced a substantial distance axially inwardly of the front end of the objective unit 2 upon which the mounting 8 is plugged in. In a particular arrangement illustrated, this latter mounting means in the objective unit 2 comprises threads 13 arranged to interfit with the threads on an auxilary mounting 14 carrying the optical accessory 15. It will be noted that the resultant position of the accessory 15 is such that it does not project beyond the front end of the objective unit 2, and thus does not interfere with the positioning of the other accessory 9, in its mounting 8, on the objective unit 2.

While specific embodiments of the invention have been shown and described in detail to illustrate the application of the principles of the invention, it will be understood that the invention may be embodied otherwise without departing from such principles.

What is claimed is:

1. In a photographic camera, a housing and an objective lens unit carried by said housing and including a tubular lens mount carrying in its interior objective lenses and having a front end portion projecting forwardly beyond said lenses and carrying a means for removably supporting an optical accessory only in front of said objective lenses, said unit including a photosensitive means, forming part of a light-measuring assembly and arranged along a path surrounding said tubular lens mount, and an outer mounting means of a diameter at least as great as said photosensitive means for removably supporting an optical accessory which will modify light which reaches both the objective lenses and said photosensitive means, said outer mounting means projecting forwardly beyond said means carried by said front end portion of said tubular lens mount so that an optical accessory carried by said means at said front end portion of said tubular lens mount can be located between the objective lenses and an optical accessory carried by said outer mounting means.

2. In a photographic camera, a housing and an objective lens unit carried by said housing and including a tubular lens mount carrying objective lenses in its interior and having a front end portion projecting forwardly beyond said objective lenses and having a means for removably mounting an optical accessory on said front end portion, said unit also including a photosensitive means, forming part of a light-measuring assembly and arranged along a path surrounding said lens mount, and an outer mounting means for removably supporting on optical accessory covering both the objective lenses and the photosensitive means; an optical accessory removably carried by said outer mounting means and covering both the photosensitive means and the objective lenses, said optical accessory having properties which require modification of the light which reaches said photosensitive means; and a second optical accessory which does not require modification of the light which reaches said photosensitive means, said second optical accessory being carried by said means at said front end portion of said tubular lens mount, having a size small enough to cover only the objective lenses without overlapping any part of said photosensitive means, and said second accessory being situated between said objective lenses and the optical accessory carried by said outer mounting means.

References Cited by the Examiner

UNITED STATES PATENTS

| | | | |
|---|---|---|---|
| 2,058,562 | 10/36 | Bucky | 95—64 X |
| 2,477,235 | 7/49 | Broido | 95—10 |
| 2,898,832 | 8/59 | Schmuck | 88—113 X |
| 2,936,685 | 5/60 | O'Brien | 95—11 |
| 3,017,813 | 1/62 | Greger | 95—10 |
| 3,031,581 | 4/62 | Kukuk | 95—64 X |

NORTON ANSHER, *Primary Examiner.*

EMIL G. ANDERSON, *Examiner.*